Dec. 8, 1936.  E. E. CATER  2,063,724
PISTON
Filed April 4, 1933
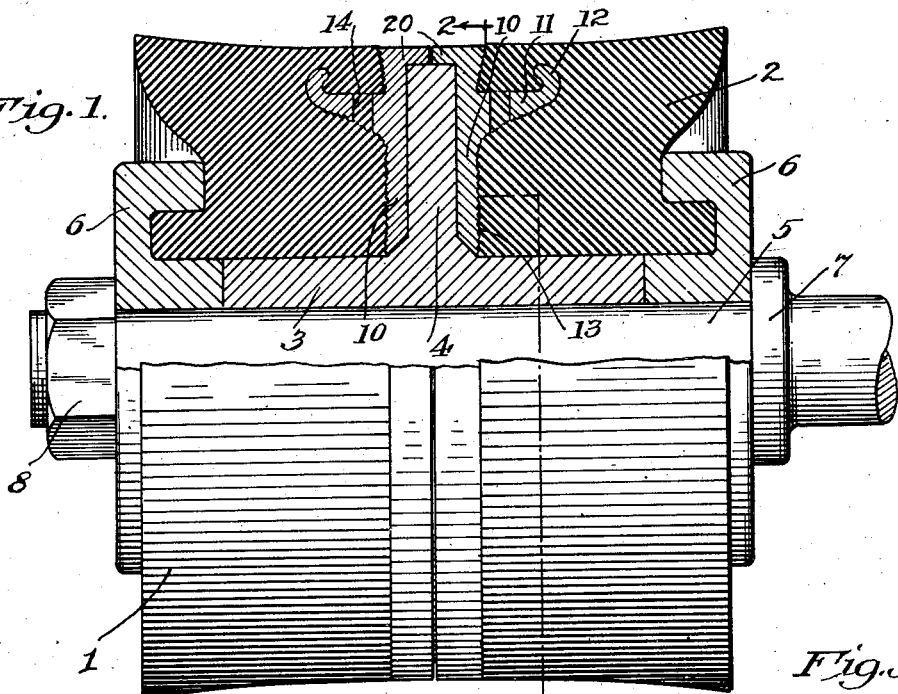
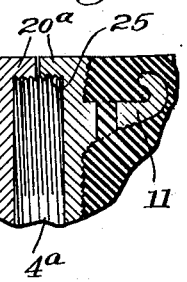
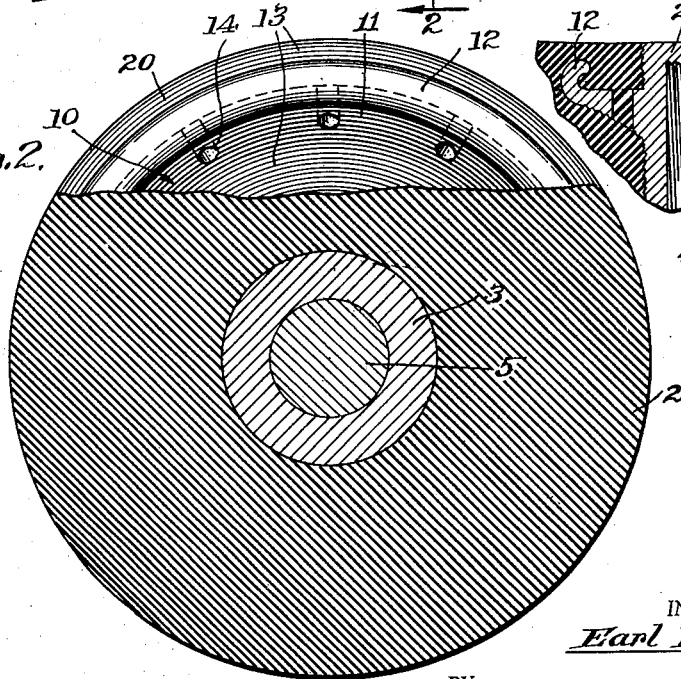
INVENTOR.
Earl E. Cater,
BY R. W. Smith
ATTORNEY.

Patented Dec. 8, 1936

2,063,724

UNITED STATES PATENT OFFICE 2,063,724

PISTON

Earl E. Cater, Los Angeles, Calif., assignor, by mesne assignments, to MacClatchie Manufacturing Company, Compton, Calif., a corporation of California Application April 4, 1933, Serial No. 664,318

6 Claims. (Cl. 309—4)

This invention is a piston for pumps and the like, and relates particularly to that type of piston wherein an annular packing of yieldable material is mounted on an axial support with an abutment projecting radially from the axial support and forming a backing against which the packing is longitudinally compressed on the pressure stroke of the piston.

It is an object of the invention to adapt a packing element for replaceable mounting on the axial support for end abutment against the radially projecting abutment; and preferably to adapt separate elements of the packing for assembly on the axial support at opposite sides of a radially projecting abutment so as to provide a double acting piston; the abutment forming a backing against which each packing element is longitudinally compressed on its pressure stroke, and preferably including means for holding each packing element against being pulled away from the piston or excessively distorted, particularly on its suction stroke.

It is a further object of the invention to provide an abutment for a packing element, including a part extending radially outwardly to the outer periphery of the packing so as to prevent shearing-off the annular working surface of the packing, particularly on its pressure stroke, with said part of the abutment made of softer material than the wall of the cylinder in which the piston is to be mounted so as to avoid excessive wear on the cylinder.

It is still a further object of the invention to provide an abutment for the end of a packing element, with the abutment including a reinforcement for the end of the packing element; and preferably to provide an abutment which includes such a reinforcement for the end of each of separate packing elements which are mounted on the axial support at opposite sides of the abutment; the reinforcement being preferably securely fixed to its packing element, and made of a material having some inherent flexibility whereby it may accommodate itself to slight distortion of its packing element, but being sufficiently rigid to hold its packing element against excessive distortion tending to tear the packing element loose from the piston on the suction stroke.

It is a still further object of the invention to provide an abutment for the end of a packing element, including a reinforcement extending to the outer periphery of the packing element; and preferably to provide an abutment which includes such a reinforcement for the end of each of separate packing elements which are mounted on the axial support at opposite sides of the abutment; the reinforcements longitudinally bracing the annular working surfaces of the packing elements and preventing them from being sheared-off, but as a result of the reinforcements being made of softer material than the cylinder, providing a sliding engagement with the cylinder wall which will avoid excessive wear.

It is a still further object of the invention to provide an abutment for the end of a packing element, including a radial flange and a surrounding collar; the radial flange being preferably fixed against longitudinal displacement relative to the piston, and the surrounding collar forming that part of the abutment which extends radially outwardly to the outer periphery of the packing element and which is made of softer material than the cylinder in which the piston is mounted; and the collar being mounted whereby on the pressure stroke of the packing element it is fixed against longitudinal displacement relative to the radial flange, so as to form a backing for the outer peripheral portion of the packing element.

It is a still further object of the invention to provide an abutment for the end of a packing element, including a radial flange, a surrounding collar and a reinforcement for the end of the packing element; the reinforcement extending to the outer periphery of the packing element, with the outer peripheral portion of the reinforcement having an integral flange extending longitudinally of the piston and overlying the radial flange so as to form the collar.

Further objects of the invention will be readily understood from the following description of the accompanying drawing, in which:

Fig. 1 is a side elevation of a piston partly in axial section.

Fig. 2 is a transverse section on the line 2—2 of Fig. 1.

Fig. 3 is a fragmentary axial section of a piston, showing a modified construction.

The invention is preferably embodied in a double acting piston comprising separate annuli 1—2 of yieldable material such as rubber, preferably mounted on a hub 3 which has a radially projecting abutment means between the proximate ends of the packing annuli. The hub 3 may be mounted on piston rod 5, and the packing annuli may be held in place by clamping rings 6 which abut the ends of hub 3 and which engage the remote ends of the cooperating packing annuli for clamping them on the hub and longitudinally compressing the packing annuli against the cooperating abutment means which is between the packing annuli. The assembled piston may be clamped against a collar 7 of the piston rod by means of a nut 8.

The abutment means which is between the packing annuli provides a longitudinal backing for each packing annulus on its pressure stroke, and preferably also includes means for preventing each packing annulus being torn loose from the piston or unduly distorted, particularly on its suction stroke. As an instance of this arrangement the abutment means may include a radial flange 4, and reinforcements 10. The radial flange 4 is preferably fixed against longitudinal displacement relative to the piston and for this purpose may be integral with the hub 3, and the reinforcements 10 abut against the sides of the flange 4, with the inner ends of the packing annuli abutting against the outer sides of the reinforcements. Each reinforcement is preferably a plate which overlies the entire cross-sectional area of the end of the abutting packing annulus, with the plate preferably secured to the packing annulus; and each reinforcement is preferably of a material having some inherent flexibility so that it may accommodate itself to normal distortion of the abutting packing annulus on its pressure stroke, but is sufficiently rigid to prevent excessive distortion of the abutting packing annulus on its suction stroke, such as might tear the packing loose from the piston. Furthermore, the material of which reinforcement 10 is made is preferably softer than the wall of the cylinder in which the piston is mounted, so that the outer peripheral portion of the reinforcement may extend to the outer peripheral portion of the abutting packing annulus and thus engage the cylinder wall without causing excessive wear on the cylinder.

The material of which each reinforcement 10 is made is preferably also such that a packing annuli of rubber or the like may be molded directly to the plate 10 and securely fixed thereto; and as an instance of material having the desired characteristic, metals such as brass, copper, zinc alloys, etc. may be employed. In practice the plate 10 is preferably of brass, the metal being preferably of some appreciable thickness forming a comparatively rigid plate and not a thin flexible sheet; and the plate being preferably secured to its packing element by molding the rubber packing directly to the brass plate.

To insure a secure connection the brass plate may have protuberances or recesses whereby an embedded engagement may be had with the molded packing; and as an instance of this arrangement the plate 10 may have an annular rib 11 preferably adjacent its outer periphery and terminating in a hooked flange as shown at 12, and adapted to have the rubber of the packing element molded around the rib and flange. The rib 11 may have openings 14 for reception of the molded rubber, and the face of plate 10 may have annular serrations 13 to which the rubber is molded.

Any radially projecting abutment for the end of a packing annulus should extend all the way to the outer periphery of the packing in order to prevent the annular working surface of the packing being sheared-off radially beyond the abutment, but if the flange 4 is so extended whereby its peripheral surface makes sliding contact with the cylinder wall, excessive wear of the cylinder results since the flange 4 is made of a relatively hard and rigid metal in order to provide a backing for the packing which will have the desired strength. The present invention provides an abutment means for the end of a packing annulus, including a part extending all the way to the outer periphery of the packing, with said part of the abutment means arranged so that on the pressure stroke of the packing annulus it is fixed against longitudinal displacement relative to the piston, and with said part of the packing annulus of sufficient longitudinal rigidity to insure an adequate backing for the outer peripheral portion of the packing annlus on its pressure stroke, but of softer material than the cylinder in which the piston is mounted so that its sliding contact with the cylinder wall does not cause excessive wear.

As an instance of this arrangement the radial flange 4 may terminate short of the outer periphery of the packing, with a collar surrounding the outer periphery of the radial flange and extending to the outer periphery of the packing. The collar is preferably removably mounted on the radial flange 4 and may be fixed against longitudinal displacement as hereinafter described; and in the double acting piston which is illustrated, a pair of collars preferably surround the flange 4, one for each of the packing annuli 1—2, as shown at 20—20.

As an instance of suitable material for the collars 20—20, they may be of a metal such as previously described, i. e. a substantially rigid but somewhat inherently yieldable and malleable metal such as brass, copper, or zinc alloy; and the reinforcements 10 may provide means whereby on the pressure stroke of its corresponding packing annulus each collar 20 is fixed against longitudinal movement relative to the piston. In the present instance wherein brass plates 10 are provided at the proximate ends of the packing elements, this may be accomplished by forming plates 10 with longitudinally extending annular flanges at their outer peripheries, with said flanges adapted to be received over the periphery of flange 4 and extending toward one another when the plates 10 are received against the respective faces of flange 4, so that these integral longitudinal flanges of the plates 10 form the collars 20. The outer peripheries of flanges 20 are substantially flush with the annular working surface of the packing so that there is no tendency to shear-off the outer peripheral surface of the packing, and the flanges being of a material such as brass which is a softer metal than that of which the cylinder is formed, their sliding contact with the cylinder wall causes no excessive wear of the cylinder. At the same time the flanges 20 have sufficient longitudinal rigidity to provide an adequate longitudinal backing for the outer peripheral portion of the packing on its pressure stroke.

In the form of the invention shown at Fig. 1 the flanges 20 are held in place overlying the periphery of flange 4 and so that on the pressure stroke of its corresponding packing annulus each of the flanges 20 is fixed against longitudinal displacement relative to the piston, by each plate 10 of which one of the flanges 20 is an integral part, abutting the radial flange 4 on the pressure stroke of the corresponding packing annulus; but if desired and as shown at Fig. 3, the flanges 20ª may be positively secured to the flange 4ª, as for example by threading the flanges 20ª onto the periphery of flange 4ª as shown at 25.

The invention thus provides a radially projecting abutment including the radial flange 4 and the reinforcements 10 which have the annular flanges 20 or 20ª overlying the periphery of flange 4, and the invention thus provides a longitudinal backing or abutment for a packing annulus of a piston, including a part extending all the way to the annular working surface of the packing but without excessive wear between said part of the abutment and the wall of the cylinder with which it makes sliding contact; and the invention also provides for clamping unitary structures, each comprising a packing element and an end reinforcement, against opposite faces of the radial flange 4, with said unitary structures securely held against being drawn away from the radial flange on their suction strokes.

I claim:

1. In a piston, packing annuli of readily compressible material having an outer peripheral working surface, and an abutment means between the packing annuli, said abutment means including a radial flange terminating radially short of the peripheral working surface of the packing annuli and reinforcements at the respective sides of the radial flange and flanged at their outer peripheries with the flanges of said reinforcements overlying the periphery of the radial flange for contact with the wall of the cylinder in which the piston is adapted to operate, the flanged reinforcements being brass plates of some appreciable thickness fixed to the proximate ends of the packing annuli.

2. In a piston, packing annuli of readily compressible material having an outer peripheral working surface, and an abutment means between the packing annuli, said abutment means including a radial flange terminating radially short of the peripheral working surface of the packing annuli and reinforcements at the respective sides of the radial flange and flanged at their outer peripheries with the flanges of said reinforcements overlying the periphery of the radial flange for contact with the wall of the cylinder in which the piston is adapted to operate, the flanged reinforcements being of a material softer than that of the cylinder wall but sufficiently rigid to prevent excessive distortion of the packing annuli on their respective suction strokes.

3. In a piston, packing annuli of readily compressible material having an outer peripheral working surface, and an abutment means between the packing annuli, said abutment means including a radial flange terminating radially short of the peripheral working surface of the packing annuli and reinforcements at the respective sides of the radial flange and flanged at their outer peripheries with the flanges of said reinforcements overlying the periphery of the radial flange.

4. In a piston, a packing annulus of readily compressible material having an outer peripheral working surface, and an abutment means at an end of the packing annulus, said abutment means including a radial flange terminating radially short of the peripheral working surface of the packing annulus and a reinforcement at the side of the radial flange which is proximate to the packing annulus and flanged at its outer periphery with the flange of said reinforcement overlying the periphery of the radial flange.

5. In a piston, packing annuli of readily compressible material having an outer peripheral working surface, and an abutment means between the packing annuli, said abutment means including a radial flange terminating radially short of the peripheral working surface of the packing annuli and a collar surrounding the outer periphery of the radial flange and held against longitudinal displacement relative thereto, the collar extending radially outwardly to the peripheral working surface of the packing annuli for contact with the wall of the cylinder in which the piston is adapted to operate, and said collar being of a material softer than that of the cylinder wall but sufficiently rigid to longitudinally brace the outer peripheral portion of the packing annuli.

6. In a piston, a packing annulus of readily compressible material having an outer peripheral working surface, and an abutment means at an end of the packing annulus, said abutment means including a radial flange terminating radially short of the peripheral working surface of the packing annulus and a collar surrounding the outer periphery of the radial flange and held against longitudinal displacement relative thereto, the collar extending radially outwardly to the peripheral working surface of the packing annulus for contact with the wall of the cylinder in which the piston is adapted to operate, and said collar being of a material softer than that of the cylinder wall but sufficiently rigid to longitudinally brace the outer peripheral portion of the packing annulus.

EARL E. CATER.